United States Patent
Kaefer et al.

(10) Patent No.: US 10,183,636 B2
(45) Date of Patent: Jan. 22, 2019

(54) SEALING GROMMET AND CABLE FEEDTHROUGH CONTAINING A SEALING GROMMET

(71) Applicant: LEONI BORDNETZ-SYSTEME GMBH, Kitzingen (DE)

(72) Inventors: Bernd Kaefer, Mainstockheim (DE); Matthias Groetsch, Kitzingen (DE); Gerhard Hein, Uffenheim (DE); Joerg Sauder, Euskirchen (DE)

(73) Assignee: LEONI Bordnetz-Systeme GmbH, Kitzingen (DE)

( * ) Notice: Subject to any disclaimer, the term of this patent is extended or adjusted under 35 U.S.C. 154(b) by 0 days.

(21) Appl. No.: 15/695,421

(22) Filed: Sep. 5, 2017

(65) Prior Publication Data

US 2017/0361790 A1 Dec. 21, 2017

Related U.S. Application Data

(63) Continuation of application No. PCT/EP2015/080989, filed on Dec. 22, 2015.

(30) Foreign Application Priority Data

Mar. 3, 2015 (DE) .................... 20 2015 101 017 U

(51) Int. Cl.
*H01B 17/58* (2006.01)
*B60R 16/02* (2006.01)
(Continued)

(52) U.S. Cl.
CPC ....... *B60R 16/0222* (2013.01); *H01B 17/583* (2013.01); *H01R 9/0524* (2013.01);
(Continued)

(58) Field of Classification Search
CPC ............. B60R 16/0222; H01R 9/0524; H01R 13/6592; H02G 3/22; H02G 3/18; H01B 17/583
(Continued)

(56) References Cited

U.S. PATENT DOCUMENTS 7,105,750 B1 * 9/2006 Duhr .................. B60R 16/0222
16/2.1
7,709,755 B2 5/2010 Pfister
7,893,354 B2 2/2011 Albert et al.

FOREIGN PATENT DOCUMENTS

DE 10332035 A1 2/2004
DE 102005025780 A1 12/2006
(Continued)

*Primary Examiner* — Dhirubhai R Patel
(74) *Attorney, Agent, or Firm* — Laurence A. Greenberg; Werner H. Stemer; Ralph E. Locher

(57) ABSTRACT

A sealing grommet for a sealed feedthrough of a strand-shaped element through a wall, in particular for a cable feedthrough for the automotive sector, is configured for insertion in an installation direction into an opening, bordered by the wall and with a predefined opening width. The sealing grommet has a grommet body with a push-through area which extends in the installation direction and which is fed through the opening in the installation direction during installation, in such a way that it engages behind the wall in the installed state. An auxiliary element facilitating the insertion into the opening is provided, which has a circumferential sliding area containing at least one sliding surface, and wherein the at least one sliding surface bears at least partially on a circumferential surface of the push-through area.

18 Claims, 8 Drawing Sheets

(51) Int. Cl.
   *H02G 3/22*      (2006.01)
   *H01R 9/05*      (2006.01)
   *H01R 13/6592*   (2011.01)
   *F16L 5/02*      (2006.01)
   *F16L 5/10*      (2006.01)

(52) U.S. Cl.
   CPC ........... *H01R 13/6592* (2013.01); *H02G 3/22* (2013.01); *F16L 5/022* (2013.01); *F16L 5/10* (2013.01)

(58) Field of Classification Search
   USPC ..................................................... 174/153 G
   See application file for complete search history.

(56) References Cited

FOREIGN PATENT DOCUMENTS

| | | |
|---|---|---|
| DE | 102007051836 A1 | 5/2009 |
| DE | 10358002 B4 | 7/2011 |

\* cited by examiner

SEALING GROMMET AND CABLE FEEDTHROUGH CONTAINING A SEALING GROMMET

CROSS-REFERENCE TO RELATED APPLICATION

This application is a continuation, under 35 U.S.C. § 120, of copending international application No. PCT/EP2015/080989, filed Dec. 22, 2015, which designated the United States; this application also claims the priority, under 35 U.S.C. § 119, of German patent application No. DE 20 2015 101 017.6, filed Mar. 3, 2015; the prior applications are herewith incorporated by reference in their entirety.

BACKGROUND OF THE INVENTION

Field of the Invention

The invention relates to a sealing grommet for a sealed feedthrough of a strand-shaped element through a wall, in particular for a cable feedthrough for the automotive sector, which sealing grommet is configured for insertion in an installation direction into an opening, bordered by the wall and with a predefined opening width, and has a grommet body with a push-through area which extends in the installation direction and which is fed through the opening in the installation direction during installation, in such a way that it engages behind the wall in the installed state. It further relates to a cable feedthrough having a corresponding sealing grommet.

In order to seal a cable feedthrough, it is customary to push a grommet or sealing grommet made of an elastic material, for example rubber or a PU foam, over the corresponding cables or over a corresponding cable strand, and to insert the grommet together with the cables or with the cable strand into the corresponding wall aperture of the cable feedthrough.

Such a grommet is described, for example, in published, non-prosecuted German patent application DE 10 2005 025 780 A1 (corresponding to U.S. Pat. No. 7,709,755) going back to the applicant. The grommet is formed directly on a cable strand by encapsulation by injection molding, encapsulation by casting or encapsulation by foaming on the cable strand and, moreover, it is not simply plugged into a wall aperture but braced against the aperture with the aid of a dimensionally stable clamping element that supplements the grommet.

German patent DE 103 58 002 B4 discloses a further sealing grommet, which is fixed in a wall aperture by a fastening aid, here by means of a latching element. Moreover, the sealing grommet has a stiffening element, which ensures that the basic shape of the sealing grommet is maintained even in the installed state and that deformations occur only in the area of sealing lips lying on the outside. The sealing is thus affected mainly by the sealing lips.

A modified embodiment of a corresponding grommet is described in published, non-prosecuted German patent application DE 10 2007 051 836 A1 (corresponding to U.S. Pat. No. 7,893,354). The grommet is designed for two cables which are intended to be fed through a housing wall, for example, at a predefined distance from each other. It is designed as a dimensionally stable assembly and serves primarily for feeding the two cables and as a fastening solution or holding device. The actual sealing is obtained with the aid of a circumferential seal.

Further design variants of a sealing grommet are described in published, non-prosecuted German patent application DE 103 32 035 A1 and in U.S. Pat. No. 7,105,750 B1.

Irrespective of the design of such a grommet, its insertion, plugging or pressing into an opening or into a wall aperture proves to be generally difficult, since quite considerable forces often have to be applied during the insertion.

SUMMARY OF THE INVENTION

Proceeding from this, the object of the invention is to afford an advantageous possibility of sealing a cable feedthrough.

According to the invention, this object is achieved by a sealing grommet having the features of the main grommet claim and by a cable feedthrough having the features of main cable claim. Preferred developments are contained in the dependent claims. The advantages and preferred embodiments cited in respect of the sealing grommet can be transferred by analogy to the cable feedthrough, and vice versa.

A corresponding sealing grommet is configured here for a sealed feedthrough of a strand-shaped element through a wall, in particular for a cable feedthrough for the automotive sector, and as insert for an opening, a material cutout or a wall aperture.

Since such openings, material cutouts or wall apertures often have a circular cross section or certain rotation symmetry with respect to the insertion direction of the sealing grommet, a sealing grommet of the kind presented here also has a circular cross section or certain rotation symmetry. However, the concept described below can also be readily transferred to openings with a differing geometry, for example to openings with an oval or polygonal cross section. For such design variants, which are to be regarded as likewise advantageous alternative embodiments depending on the intended use, the one diameter is then no longer a characteristic variable; instead, several circumferential extents then often characterize the sealing grommet and/or the component parts of the sealing grommet.

Within the meaning of this application, a circumferential extent is to be understood as an extent along an axis, characteristic of the respective geometry, transverse to the insertion direction or installation direction of the sealing grommet, which is assigned a characteristic opening width of the opening. If the opening has a rectangular cross section for example, then the opening can be characterized by two opening widths, which are typically designated as height and width of the opening. A sealing grommet configured for such an opening necessarily also has two characteristic extents and thus two characteristic axes transverse to the installation direction of the sealing grommet, i.e. a height and a width. In the consideration of relationships, the height of the sealing grommet is then always compared to the height of the opening, and the width of the sealing grommet to the width of the opening.

The sealing grommet is preferably configured for an opening of defined geometry and of defined opening width or defined opening widths and is configured to be inserted in the installation direction into such an opening that is delimited by a wall and that has a predefined opening width.

In each case, the sealing grommet contains a grommet body by which the opening can be sealed, and an auxiliary element which primarily serves to facilitate the insertion of the sealing grommet and thus of the grommet body into the opening. For this purpose, the auxiliary element has a circumferential sliding area containing at least one sliding surface, wherein the at least one sliding surface at least partially covers a circumferential surface of the grommet body or bears on a circumferential surface lying in an area in which the grommet body typically has a maximum circumferential extent greater than or approximately equal to the predefined opening width of the opening. During the installation, i.e. the insertion into the opening, this area, hereinafter designated as push-through area, is fed through the opening in the installation direction, and the sliding surface, instead of the circumferential surface of the grommet body lying underneath, then slides along the wall delimiting the opening.

It should be noted here suitable materials for corresponding grommet bodies typically have high coefficients of friction, for which reason high frictional forces occur upon insertion of corresponding grommet bodies, which forces then have to be overcome during the insertion. The auxiliary element, however, has a sliding area which, in accordance with the term, permits easier sliding and for this purpose has a relatively low coefficient of friction, such that the frictional forces that occur during the insertion of the sealing grommet are reduced compared to a traditional seal or a traditional grommet body without a corresponding auxiliary element, and therefore the insertion of the sealing grommet into a corresponding opening is facilitated. In other words, the installation forces that have to be applied during the installation of the sealing grommet are reduced in the case of the sealing grommet described here. The coefficient of friction of the sliding area for kinetic friction is preferably less than 0.6 and more preferably less than 0.2 in the case of conventional wall materials around the opening or material cutout.

The sliding area of the auxiliary element is in this case expediently formed by the surface or parts of the surface of the auxiliary element, and, accordingly, the reduced coefficient of friction is preferably predefined by a suitable choice of the material for the auxiliary element. The material of the auxiliary element is typically harder than the material of the grommet body, and the surface of the auxiliary element is preferably smooth, at least in the areas that form the sliding area.

For simple production of the sealing grommet, it is additionally advantageous if the auxiliary element is designed in one piece, that is to say, for example, as an integral injection-molded part or cast part.

Alternatively, the auxiliary element is made up of at least two auxiliary element parts which are then put together, before or during the installation, and are typically secured to each other, for example welded to each other or plugged one into the other. Of particular advantage is an embodiment in which the auxiliary element is made up of two in particular half-shell-shaped circumference segments and is assembled such that, during the installation, i.e. the connection to the grommet body, these segments can be plugged onto the grommet body circumferentially, i.e. not in the direction of insertion of the sealing grommet, or can be placed onto the grommet body and thereafter secured to each other. In this way, the installation of the sealing grommet also proves to be relatively easy and does not require the application of much force. For securing them to each other, the individual parts of the auxiliary element are here welded to each other, for example, or connected to each other by a plug-in connection.

In cases in which the auxiliary element is configured in one piece, the sealing grommet is more preferably composed of exactly two one-piece components, namely the grommet body and the auxiliary element. In this way, the sealing grommet is kept simple, which among other things limits the additional costs by comparison with a simple conventional grommet body. Irrespective of the design of the auxiliary element, the grommet body is in all cases configured in one piece.

It is moreover advantageous if the sealing grommet, in particular the grommet body, is configured as a radial seal and preferably as a grommet for a cable feedthrough, in particular if the sealing grommet is provided for the automotive sector or generally for series productions. In these cases specifically, even quite small improvements or simplifications prove to be particularly expedient in individual manufacturing process steps.

As regards their geometric configuration, the grommet body and the auxiliary element are expediently adapted to the geometry of the opening and, in the case of a cable feedthrough, also to the geometry of the cable strand provided. Accordingly, the auxiliary element preferably has a ring-shaped configuration, for example, if the sealing grommet is configured for a round opening.

Moreover, the grommet body preferably has a conical basic shape at least in the push-through area, in which case the grommet body preferably widens conically counter to the installation direction.

Alternatively or in addition to this, the auxiliary element, at least in the installed state of the sealing grommet, also preferably has a conical basic geometry, such that the auxiliary element can be more easily inserted into a corresponding opening, material cutout or wall aperture and in particular can be engaged therein. It should be noted here that grommet bodies or seals according to the prior art are typically configured in such a way that they have to be compressed at least in certain areas, so that they can be inserted into the opening provided. The compression needed for the insertion generally entails the application of quite a considerable force, as a result of which the insertion of the grommet body into a corresponding material cutout is relatively complicated and sometimes quite difficult. By virtue of a conical basic geometry of the auxiliary element, the necessary compression takes place gradually with the insertion of the sealing grommet into the opening, which in turn facilitates the insertion.

In an advantageous development, the auxiliary element has a conical shape with a first portion and, adjoining the latter counter to the installation direction, a second portion. The first portion has a maximum diameter or a maximum circumferential extent, which is smaller than the opening width of the opening, and/or wherein the second portion has a maximum diameter or a maximum circumferential extent, which is greater than the opening width of the opening. The second portion is expediently radially compressible in the manner of a spring element.

It is moreover advantageous if the auxiliary element bears at least partially on a sealing lip, a sealing ring or a sealing lamella in the push-through area of the grommet body and in this way facilitates in particular the insertion of the sealing lip, the sealing ring or the sealing lamella.

In the interest of simple production of the sealing grommet, the auxiliary element is moreover plugged onto the grommet body. According to one design variant, the sealing grommet is moreover preferably formed by two separate parts, which are connected to each other in particular only by a form-fit connection or frictional connection, not by material bonding.

In an advantageous development, the auxiliary element is turned back over a sealing lip of the grommet body, wherein the auxiliary element, on the one hand, and the sealing lip of the grommet body, on the other hand, are preferably of an annular and/or conical shape.

Furthermore, irrespective of whether the auxiliary element is configured in several parts or one part, it preferably has at least two geometric main elements which differ from each other in particular in terms of their function. Thus, the auxiliary element according to one design variant has a base, in particular a ring-shaped base. Moreover, a plurality of webs, teeth or fingers, in particular more than ten thereof, are preferably formed integrally or secured on this base and form or at least in part form the sliding area. The fingers, if provided, and/or the webs, if provided, are more preferably distributed about the circumference of the ring-shaped base of the auxiliary element, and the outwardly directed surfaces of the fingers and/or of the webs form a sliding area composed of several sliding surfaces.

Moreover, it is advantageous if the stiffening webs are formed in the first portion and the fingers are formed in the second portion of the auxiliary element, and if the first portion bears on an annular web of the grommet body and the second portion bears on a sealing lip in the push-through area.

It is additionally of advantage if the fingers, if provided, form spring elements which, upon insertion of the sealing grommet, initially deflect inward and then deflect outward again as soon as the sealing grommet has reached its final installation position in a corresponding opening. In an advantageous development, the fingers, which are strip-shaped or plate-shaped for example, then together form a spring unit which in particular has a conical basic geometry.

The webs in turn advantageously serve also as stiffening webs for the auxiliary element, such that with their aid at least one area of the auxiliary element, namely the base, has a relatively dimensionally stable structure.

Moreover, the auxiliary element according to a first design variant is configured purely as an installation aid and, accordingly, the auxiliary element is in this case removed from the grommet body, after the insertion of the sealing grommet into a corresponding material cutout, and taken out of the material cutout and guided away from the latter. In this case, it is also advantageous if the auxiliary element is configured as a reusable or repeatedly usable installation aid, which can be employed for several installation processes, i.e. as an aid for the insertion of several grommet bodies.

Alternatively, after insertion into a corresponding material cutout, the auxiliary element is not removed again and, in such a case, the grommet body and the auxiliary element form a kind of sealing unit, in particular a cable feedthrough.

In both cases, the auxiliary element is preferably fed all the way through the opening upon insertion of the sealing grommet. Accordingly, the auxiliary element, in contrast to the grommet body in the installation state, is positioned completely outside the opening or the wall aperture and thus does not contribute to the sealing or filling of the opening.

Furthermore, it is of advantage if, in the final installation state, the sealing grommet is as it were latched in the opening with the aid of the auxiliary element and/or of the grommet body. According to one design variant, the aforementioned fingers form a latching element, wherein the fingers in the latched state provide a barb-like effect when an attempt is made to pull the sealing grommet back out of the corresponding opening, the material cutout or the corresponding wall aperture.

Particularly if the auxiliary element contributes to fixing or securing the sealing grommet in a corresponding opening, it is moreover advantageous to connect the auxiliary element and the grommet body to each other, for example by bonding them to each other. Alternatively, the connection is configured as a releasable connection, wherein the auxiliary element is secured on the grommet body by a tongue-and-groove connection for example. A latching connection is also advantageous, with preference being given to a combination of tongue-and-groove connection and latching connection. In this case, the corresponding groove of the tongue-and-groove connection is provided with an undercut, and the counterpart has a corresponding projection which protrudes into the undercut when the tongue-and-groove connection is formed.

Moreover, for the production of the grommet body, it is preferable to use an elastomer and/or vulcanized rubber. It is also advantageous here if the grommet body is produced from a single material.

According to a further design variant, the grommet body is configured as a foam part and produced for example from polyurethane (PUR).

The auxiliary element is also preferably produced from a single material, preferably using plastics such as polyoxymethylene (POM). Alternatively, the auxiliary element is produced from a metal.

Other features which are considered as characteristic for the invention are set forth in the appended claims.

Although the invention is illustrated and described herein as embodied in a sealing grommet and a cable feedthrough containing a sealing grommet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts that correspond to each other are provided in each case with the same reference signs in all of the figures.

Figure 1:
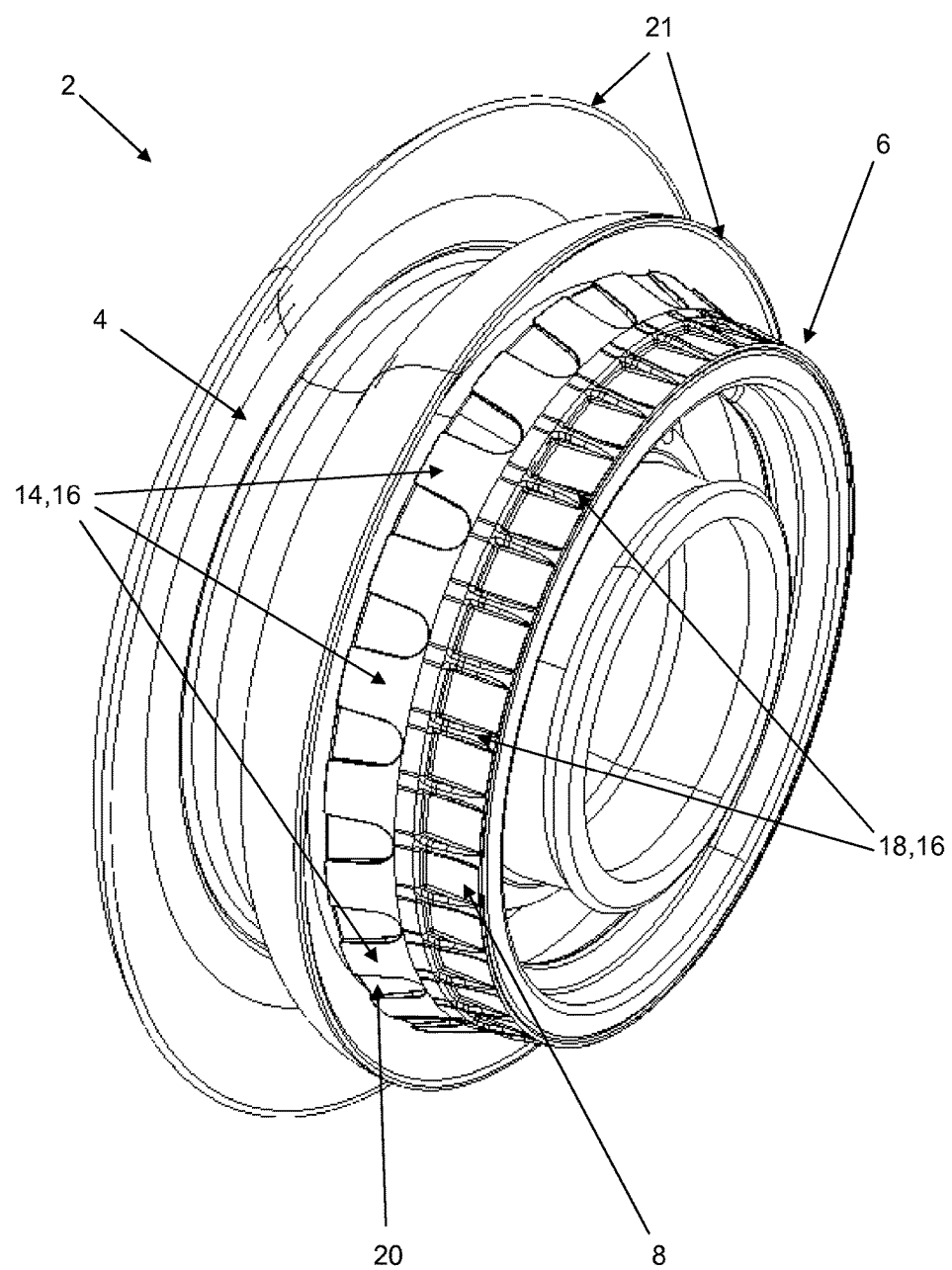
FIG. 1 is a diagrammatic, perspective view of a sealing grommet composed of a grommet body and of an auxiliary element according to the invention.

Referring now to the figures of the drawings in detail and first, particularly to FIG. 1 thereof, there is shown a sealing grommet 2 described below and is configured for cable feedthroughs 1 for the automotive sector and is configured for round openings with a defined opening width. Each of the sealing grommets 2 contains a grommet body 4, which is produced for example as a polyurethane foam part and therefore as a one-piece component, or from rubber. As is shown in FIG. 1, an auxiliary element 6 is plugged onto the grommet body 4, the auxiliary element 6 likewise being configured in one piece, but being made of a harder material, for example polyoxymethylene.

According to an alternative design, the auxiliary element 6 is composed or two semi-circular or half-shell-shaped circumference segments 6a, 6b which, during the installation of the sealing grommet 2, are placed circumferentially on the grommet body 4 of the sealing grommet 2 and are thereafter connected to each other. A design of this kind is shown in FIG. 2, where the intersection between the two circumference segments 6a, 6b of the auxiliary element 6 is indicated by a partition line T.

Moreover, as a geometric basic body, the auxiliary element 6 has an annular, hollow-cylindrical base 8 which, in the plugged-on state, bears on an annular web RS of the grommet body, and on the inside of which an annular spring 10 is integrally formed. In the plugged-on state of the auxiliary element 6, the spring 10a engages in a groove 12a on the grommet body 4, such that the grommet body 4 and the auxiliary element 6 are connected to each other by a tongue-and-groove connection.

Figure 9:
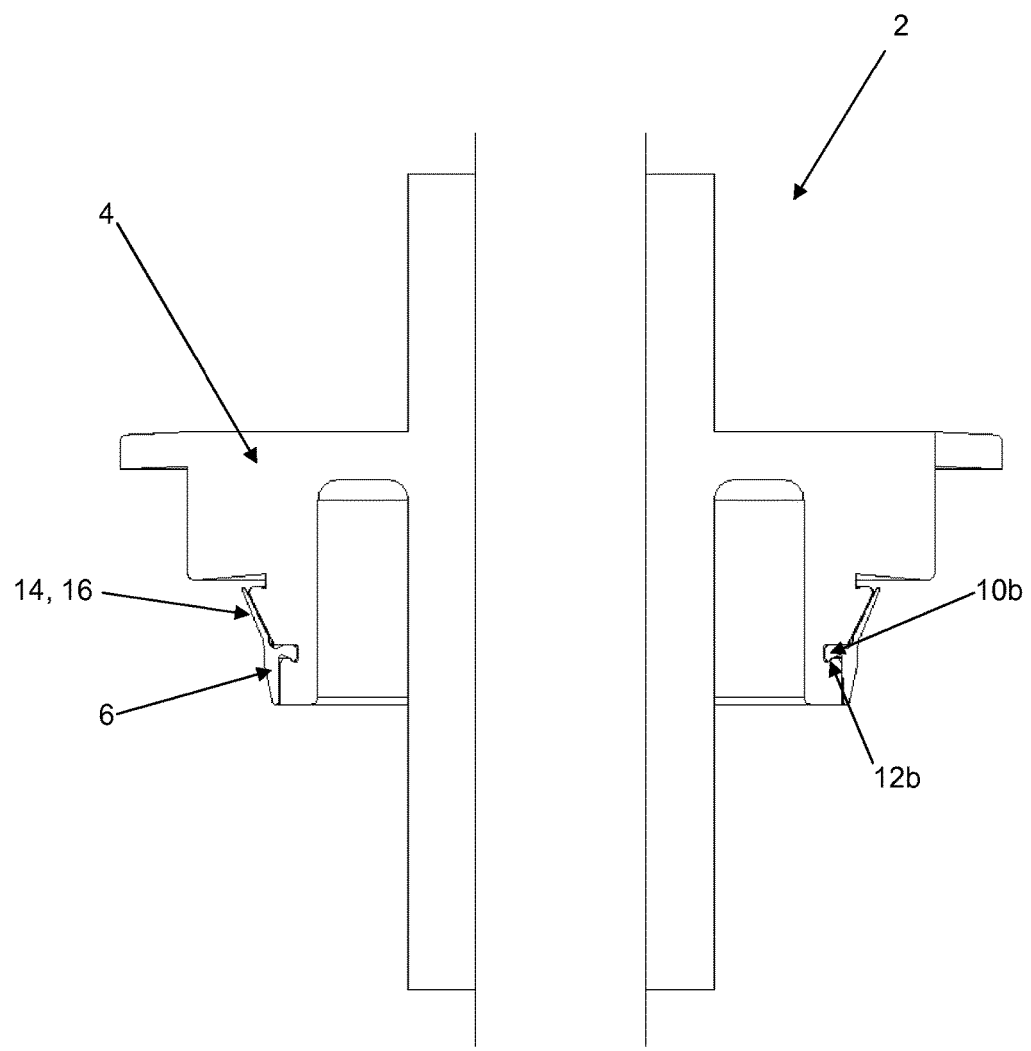
FIG. 9 is a sectional view of the fourth design variant of the sealing grommet together with the cable.

An alternative connection variant is indicated in the sectional view in FIG. 9, where a groove 12b with an undercut is formed on the grommet body 4. As a complement thereto, the associated spring 10b then has a complementary projection which protrudes into the undercut, such that in this case a combination of tongue-and-groove connection and latching connection is formed between the grommet body 4 and the auxiliary element 6.

Figure 2:
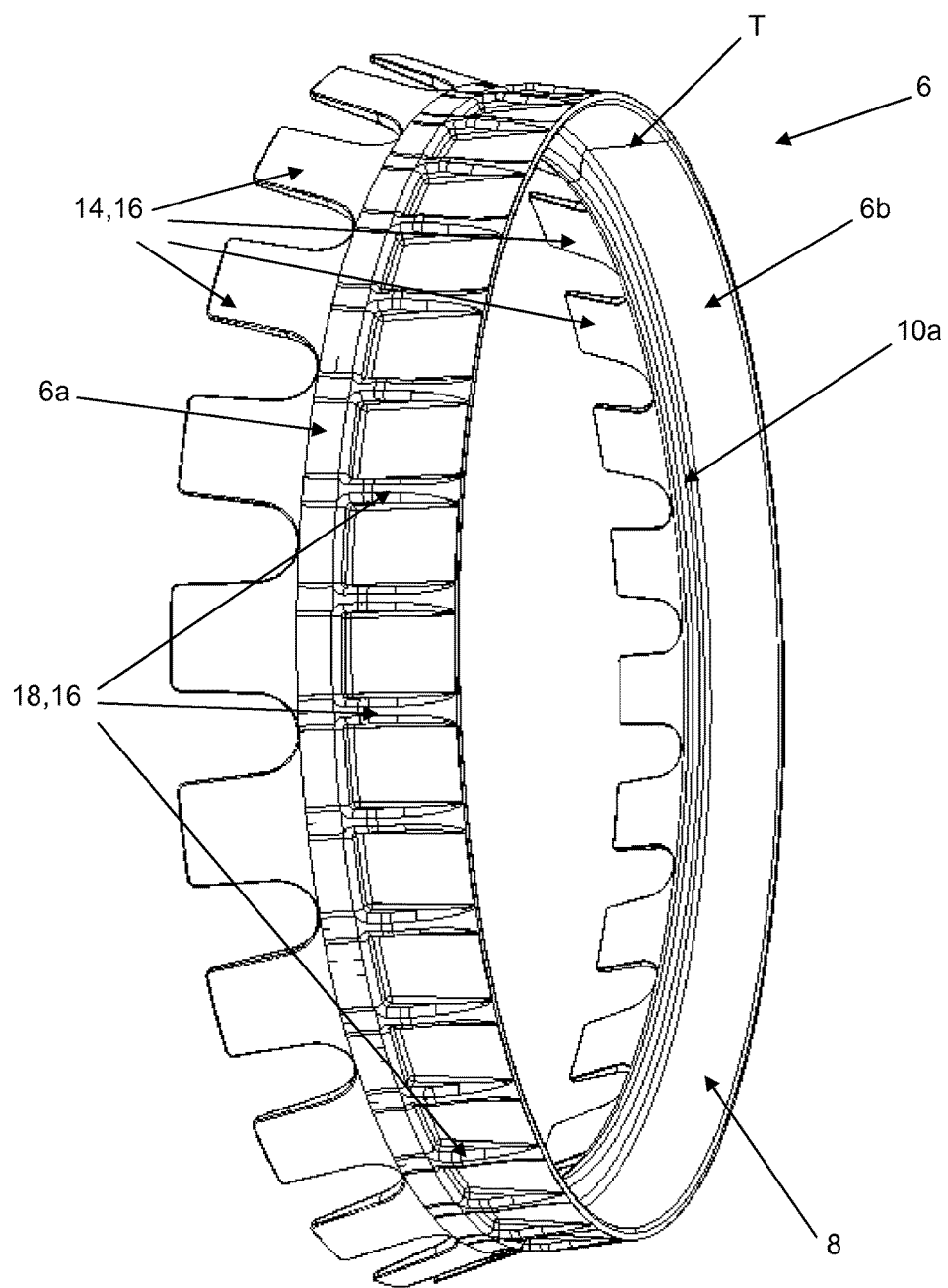
FIG. 2 is a perspective view of the auxiliary element.
Figure 3:
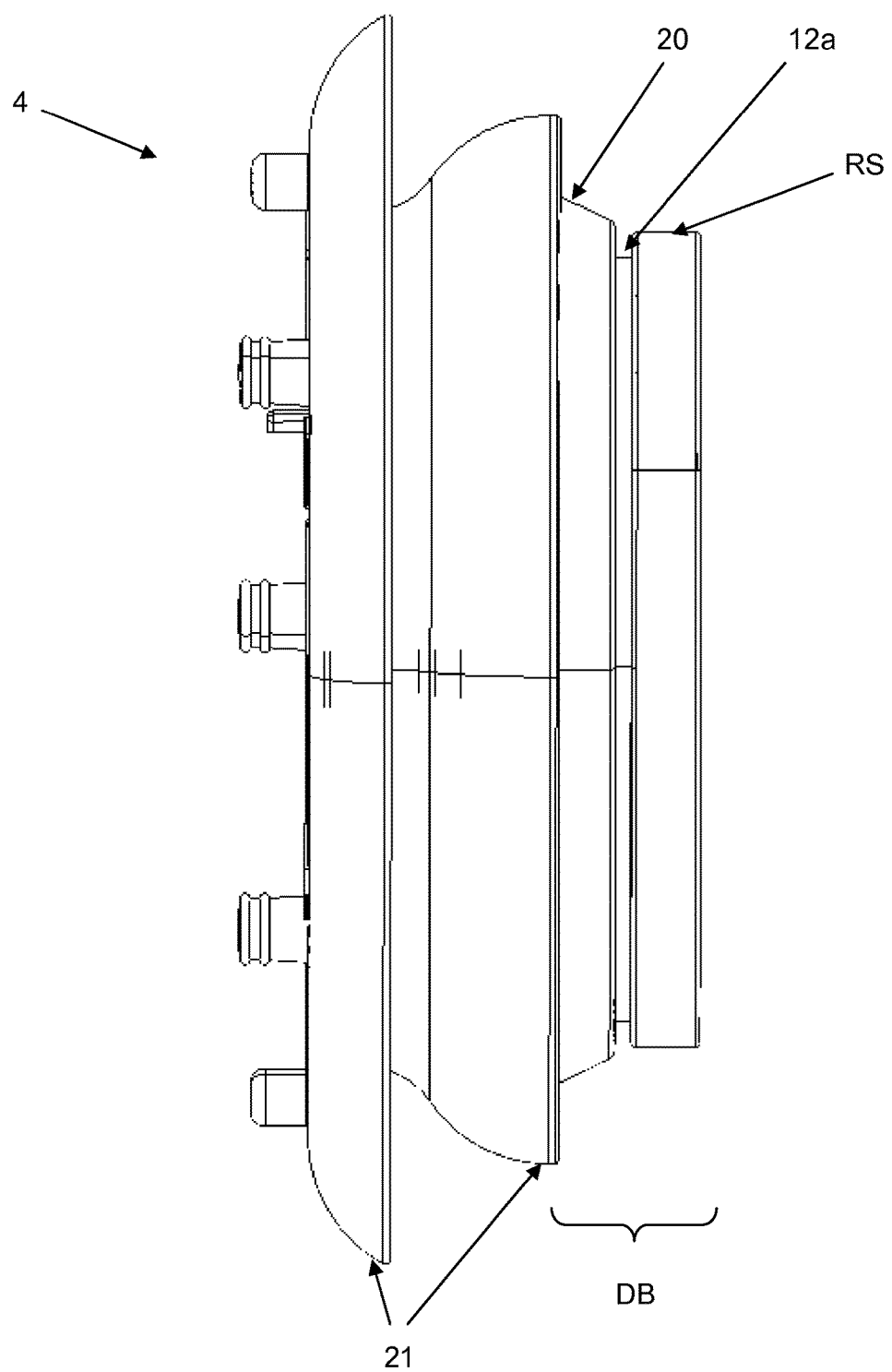
FIG. 3 is a side view of the grommet body.
Figure 4:
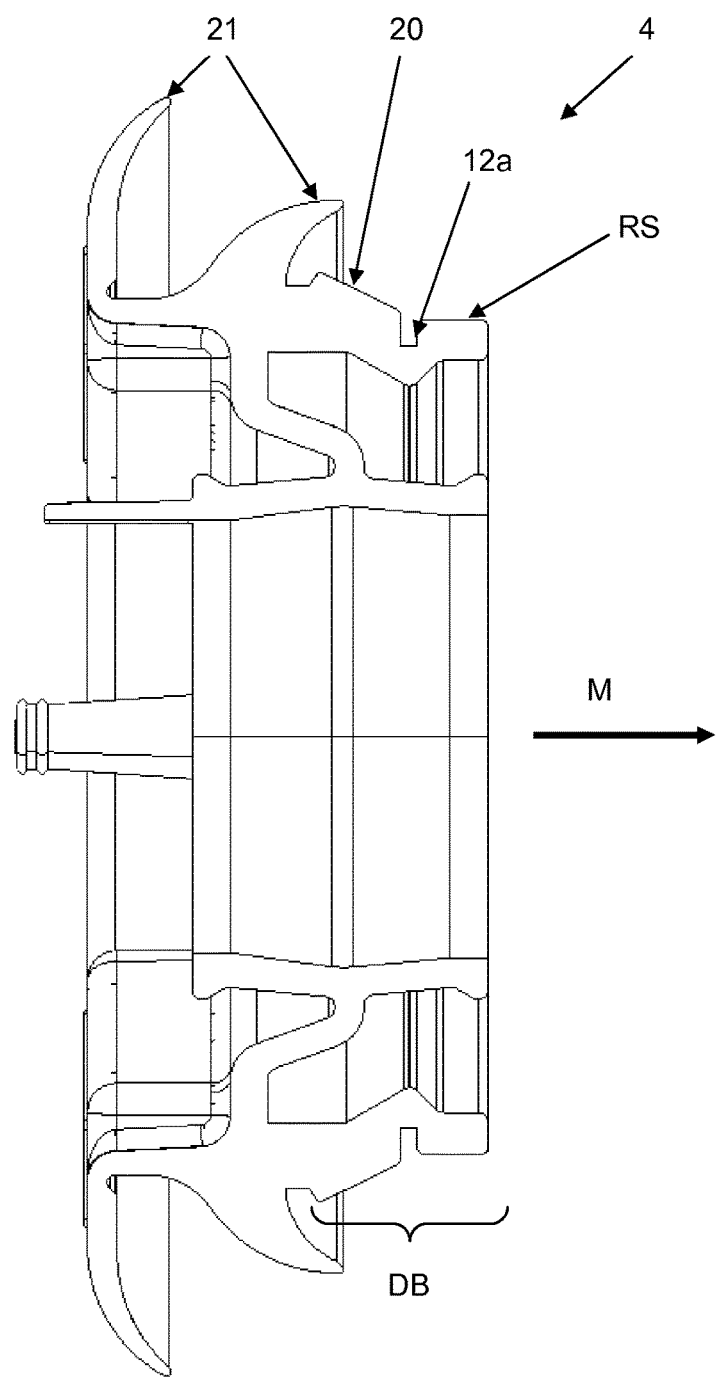
FIG. 4 is a sectional view of the grommet body.
Figure 5:
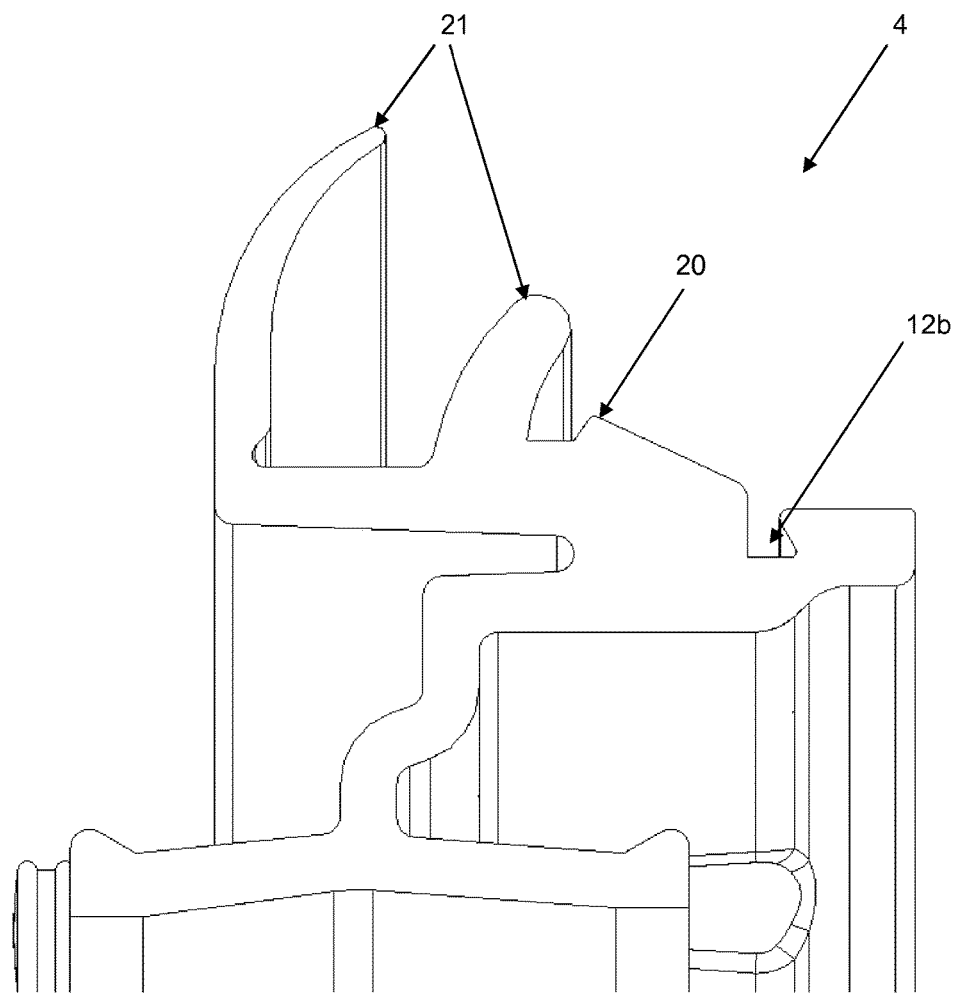
FIG. 5 is a partial sectional view of an alternative embodiment of the grommet body of a second design variant of the sealing grommet.
Figure 6:
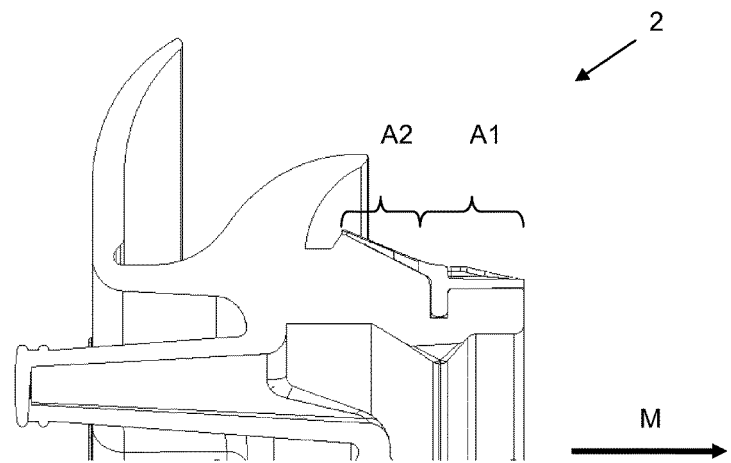
FIG. 6 is a partial sectional view of a third design variant of the sealing grommet.

According to FIG. 2, and in a manner similar to a crown, a plurality of in particular plate-shaped fingers 14, teeth or prongs are integrally formed on the annular base 8 of the auxiliary element 6 and are bent slightly outward and thus give the auxiliary element 6 a conical basic geometry. The outwardly directed surface of each finger 14 forms a sliding surface 16 with a low coefficient of friction. The sliding surfaces 16 are here distributed uniformly about the circumference of the auxiliary element 6 and, moreover, are part of a sliding area or of a sliding surface, which facilitates the insertion of the sealing grommet into an opening provided for this purpose.

This sliding area is also composed of the outwardly directed surfaces of a plurality of stiffening webs 18 which are likewise distributed uniformly about the circumference of the auxiliary element 6 and are formed integrally on the outside of the base 8. Here, the stiffening webs 18 are configured in the manner of small ramps and thus contribute to the conical basic geometry of the auxiliary element 6.

Figure 7:
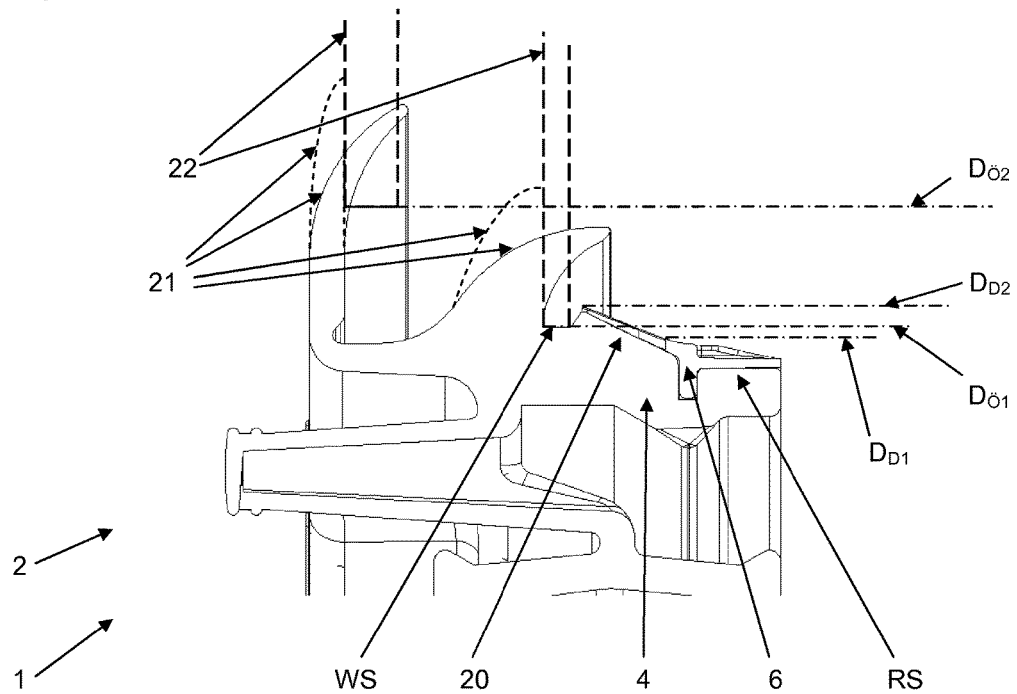
FIG. 7 is a partial sectional view of the third design variant of the sealing grommet in an installed situation with two wall apertures.
Figure 8:
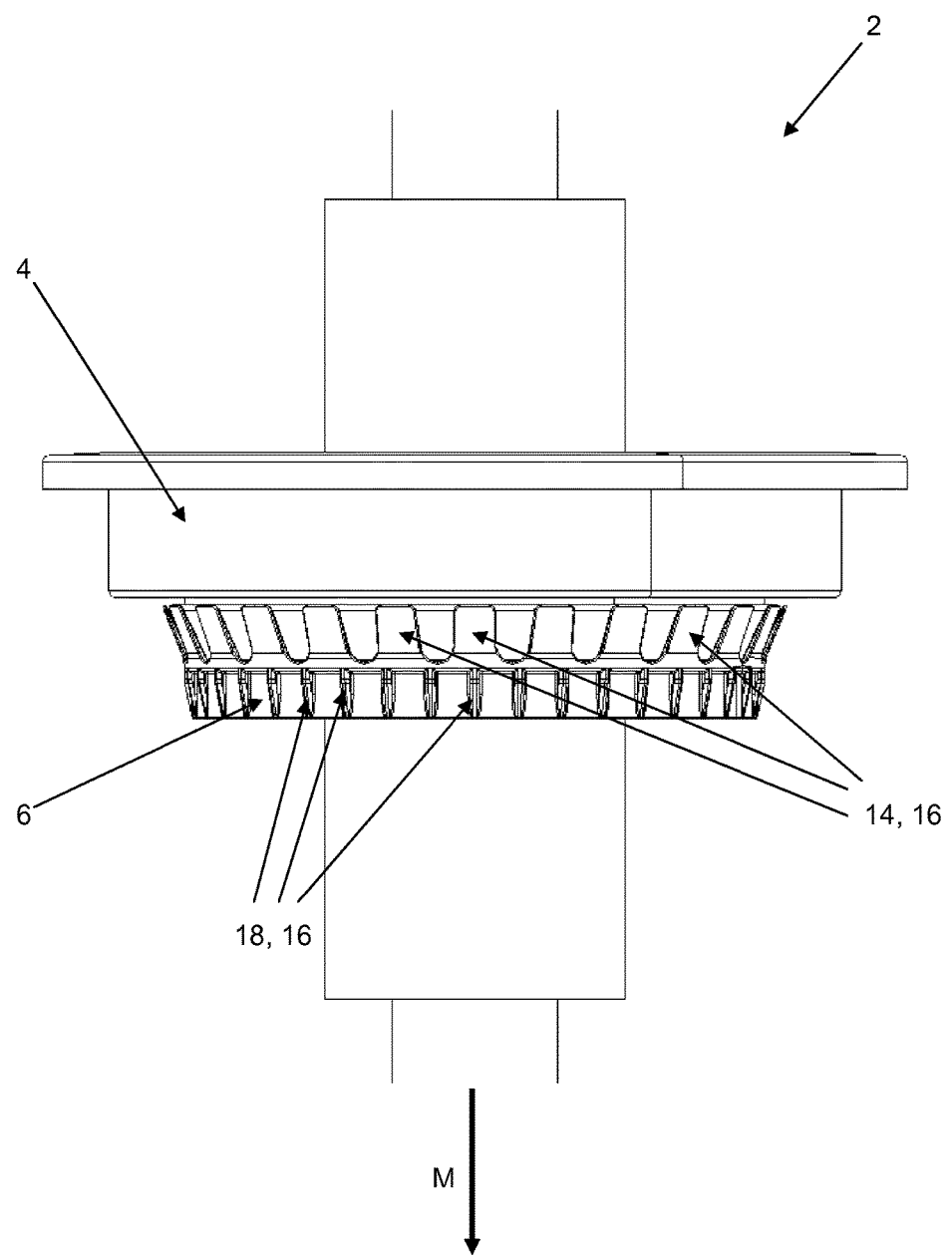
FIG. 8 is a side view of a fourth design variant of the sealing grommet together with a cable.

On account of the conical basic geometry of the auxiliary element 6, and on account of the shape of the grommet body 4, the auxiliary element 6 in the plugged-on state has a first portion A1 formed by the base 8 with the stiffening webs 18 and a second portion A2 formed by the fingers 14, wherein the first portion A1 has a maximum width or diameter $D_{D1}$, which is smaller than the diameter $D_{Ö1}$ of the opening, and wherein the second portion A2 has a maximum diameter $D_{D2}$, which is greater than the diameter $D_{Ö1}$ of the opening. The relationships are indicated in FIG. 7 by dot-and-dash lines. The diameters $D_{D1}$ and $D_{D2}$ of the auxiliary element 6 correspond to the associated diameters $D_{D1}$ and $D_{D2}$ of the sealing grommet 2.

This relationship also applies analogously to the grommet body 4, wherein the portion on which the first portion A1 of the auxiliary element 6 bears in the plugged-on state has a maximum diameter smaller than the diameter $D_{Ö1}$ of the opening, and wherein the portion on which the second portion A2 of the auxiliary element 6 bears in the plugged-on state has a maximum diameter greater than the diameter $D_{Ö1}$ of the opening.

In the plugged-on state of the auxiliary element 6, the fingers 14 bear on a sealing lip 20 of the grommet body 4 and, accordingly, the auxiliary element 6 is turned at least partially over the sealing lip 20 of the grommet body 4. The sealing lip 20 here has a ramp-shaped profile and widens conically counter to an installation direction M.

During the insertion of the sealing grommet 2 in installation direction M into a corresponding wall aperture, the sealing grommet 2 strikes with the sealing lip 20 and the fingers 14 against an annular opening which is delimited by a wall 22 and of which the diameter $D_{Ö1}$ is smaller than the maximum diameter $D_{D2}$ of the sealing grommet 2 in the area of the sealing lip 20. The sealing lip lies in the push-through area DB which, during the installation, is fed through the opening. As the sealing grommet 2 or rather the push-through area DB is pushed into or through the opening, the fingers 14 are thus deflected inward and compress the sealing lip 20 until the sealing grommet 2 in this area has a diameter smaller than or equal to the diameter $D_{Ö1}$ of the opening. After the push-through area DB has passed through this opening, the springs 14 deflect back outward and the sealing lip 20 expands to its original circumference, such that the sealing lip 20 on the one hand and the fingers 14 on the other hand engage behind the opening, as a result of which the sealing grommet 2, as indicated in the illustrative embodiment according to FIG. 7, is latched in the wall aperture.

In the illustrative embodiment according to FIG. 7, the sealing grommet 2 serves to form a cable feedthrough through two walls 22, wherein the respective openings have different diameters $D_{Ö1}$, $D_{Ö2}$. In the final installation state, indicated by dashed lines, a plate-like sealing lip 21 then bears flat on each of the two walls 22, and one of the walls 22 is as it were clamped between two sealing lips 20, 21, i.e. a plate-like sealing lip 21 and the sealing lip 20 with the ramp-shaped profile. The wall 22 bears on an annular or cylindrical portion of the grommet body 4 which is positioned as wall seat WS between the plate-like sealing lip 21 and the sealing lip 20 with the ramp-shaped profile. The two plate-like or plate-shaped sealing lips 21 serve here not only as liquid barriers but also as support elements, which bear flat on the walls 22.

The invention is not restricted to the illustrative embodiment described above. Rather, other variants of the invention can also be deduced by a person skilled in the art, without departing from the subject matter of the invention. In particular, furthermore, all of the individual features described in connection with the illustrative embodiment can also be combined with one another in some other way, without departing from the subject matter of the invention.

The following is a summary list of reference numerals and the corresponding structure used in the above description of the invention:

1 cable feedthrough
2 sealing grommet
4 grommet body 6 auxiliary element
6a,6b circumference segment
8 base
10a/10b spring
12a/12b groove
14 finger
16 sliding surface
18 stiffening webs
20 sealing lip
21 plate-shaped sealing lip
22 wall
M installation direction
T partition line
DB push-through area
RS annular web
WS wall seat
A1 first portion
A2 second portion
$D_{Ö1}$ diameter of opening 1/wall aperture 1
$D_{Ö2}$ diameter of opening 2/wall aperture 2
$D_{D1}$ diameter of sealing grommet in portion A1
$D_{D2}$ diameter of sealing grommet in portion A2

The invention claimed is:

1. A sealing grommet to seal a feedthrough of a strand-shaped element through a wall, the wall having an opening formed therein with a predefined opening width and the sealing grommet being configured for insertion in an installation direction into the opening, the sealing grommet comprising:
a grommet body having a push-through area extending in the installation direction, said grommet body having a sealing lip widening conically counter to the installation direction in said push-through area, and said grommet body being fed through the opening in the installation direction during installation, in such a way that said grommet body engages behind the wall in an installed state, said grommet body being one piece; and
an auxiliary element facilitating the insertion into the opening, said auxiliary element having a circumferential sliding area with at least one sliding surface, said auxiliary element being plugged onto said grommet body, and said at least one sliding surface bears at least partially on a circumferential surface of said push-through area.

2. The sealing grommet according to claim 1, wherein said grommet body, in said push-through area, has a maximum circumferential extent which is greater than or equal to the predefined opening width of the opening, such that said sliding surface, during the insertion, slides along the wall delimiting the opening.

3. The sealing grommet according to claim 1, wherein said grommet body is configured as a radial seal.

4. The sealing grommet according to claim 1, wherein said circumferential sliding area is produced from a harder material than said grommet body.

5. The sealing grommet according to claim 1, wherein said auxiliary element is composed of circumference segments, in such a way that, during the installation, said circumference segments can be placed circumferentially onto said grommet body.

6. The sealing grommet according to claim 1, wherein the sealing grommet is composed of two one-piece components, namely said grommet body and said auxiliary element.

7. The sealing grommet according to claim 1, wherein said auxiliary element, at least in the installed state, has a conical basic geometry with a first portion and, adjoining said first portion counter to the installation direction, a second portion, wherein said first portion has a maximum diameter, which is smaller than the predefined opening width of the opening, and wherein said second portion has a maximum diameter, which is greater than the maximum diameter of said first portion and greater than the predefined opening width of the opening.

8. The sealing grommet according to claim 7, wherein said auxiliary element is ring-shaped and has a plurality of fingers which are distributed about a circumference of said auxiliary element and which, in the installed state, bear on said push-through area, each of said plurality of fingers defines a sliding surface.

9. The sealing grommet according to claim 8, wherein said auxiliary element, at least in the installed state, has a ring-shaped base with said plurality of fingers formed or secured thereon, said ring shaped base bears on an annular web of said grommet body and said ring-shaped base has an outer side that is not covered by said grommet body.

10. The sealing grommet according to claim 8, wherein said auxiliary element is ring-shaped and has a plurality of stiffening webs which are distributed about a circumference of said auxiliary element and each of said stiffening webs forms said sliding surface.

11. The sealing grommet according to claim 10, wherein:
said grommet body has an annular web; and
said stiffening webs are formed in said first portion and said fingers are formed in said second portion of said auxiliary element, and in that said first portion bears on said annular web of said grommet body.

12. The sealing grommet according to claim 1, wherein said auxiliary element is detachable or can be pulled off from said grommet body in the installation direction, in such a way that, after the installation has taken place, said auxiliary element is removable in a manner of a repeatedly detachable installation aid.

13. The sealing grommet according to claim 1, wherein in the installed state, the sealing grommet is latched in the opening with an aid of said auxiliary element.

14. The sealing grommet according to claim 1, wherein said auxiliary element is ring-shaped and has a plurality of fingers which are distributed about a circumference of said auxiliary, wherein said fingers form barbs as soon as said auxiliary element is latched in the opening together with said grommet body.

15. The sealing grommet according to claim 1, wherein said auxiliary element is secured on said grommet body by means of a form-fit connection.

16. The sealing grommet according to claim 1, wherein adjacent to said push-through area counter to the installation direction, said grommet body has a wall seat shaped like an annular groove for receiving the wall, and a plate-shaped sealing lip is moreover formed subsequent to the wall seat counter to the installation direction.

17. The sealing grommet according to claim 1, wherein said grommet body is produced from rubber or is a foam part.

18. A cable feedthrough through a wall having an opening formed therein and with a predefined opening width, the cable feedthrough comprising:
a sealing grommet configured for insertion in an installation direction into the opening, said sealing grommet containing:
a grommet body having a push-through area extending in the installation direction, said grommet body having a sealing lip widening conically counter to the installation direction in said push-through area, and said grommet body being fed through the opening in the installation direction during installation, in such a way that said grommet body engages behind the wall in an installed state, said grommet body being one piece; and an auxiliary element facilitating the insertion into the opening, said auxiliary element having a circumferential sliding area with at least one sliding surface, said auxiliary element being plugged onto said grommet body, and said at least one sliding surface bears at least partially on a circumferential surface of said push-through area.

* * * * *